(12) United States Patent
Yasuumi et al.

(10) Patent No.: US 10,759,134 B2
(45) Date of Patent: Sep. 1, 2020

(54) METHOD FOR THREE-DIMENSIONALLY SHAPING RESIN PACKAGING MEMBER, AND RESIN PACKAGING MEMBER

(71) Applicant: Toyo Seikan Co., Ltd., Shinagawa-ku, Tokyo (JP)

(72) Inventors: Takahiro Yasuumi, Yokohama (JP); Madoka Yamaguchi, Yokohama (JP); Yasushi Hatano, Tokyo (JP); Kouji Kuriyama, Yokohama (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 86 days.

(21) Appl. No.: 16/064,119

(22) PCT Filed: Dec. 8, 2016

(86) PCT No.: PCT/JP2016/086494
§ 371 (c)(1),
(2) Date: Jun. 20, 2018

(87) PCT Pub. No.: WO2017/119231
PCT Pub. Date: Jul. 13, 2017

(65) Prior Publication Data
US 2018/0370174 A1    Dec. 27, 2018

(30) Foreign Application Priority Data
Jan. 5, 2016    (JP) .................................. 2016-000660

(51) Int. Cl.
*B31B 70/00* (2017.01)
*B29C 43/00* (2006.01)
(Continued)

(52) U.S. Cl.
CPC .............. *B31B 70/88* (2017.08); *B29C 43/46* (2013.01); *B29C 43/52* (2013.01); *B29C 59/026* (2013.01);
(Continued)

(58) Field of Classification Search
CPC ......... B31B 70/00; B31B 70/70; B31B 70/74; B31B 70/76; B31B 70/80; B31B 70/88;
(Continued)

(56) References Cited

U.S. PATENT DOCUMENTS

| | | |
|---|---|---|
| 2009/0075104 A1 | 3/2009 | Tornatore |
| 2013/0071589 A1 | 3/2013 | Hannington et al. |
| 2015/0071574 A1 | 3/2015 | Fraser et al. |

FOREIGN PATENT DOCUMENTS

| | | |
|---|---|---|
| CN | 101218097 A | 7/2008 |
| CN | 103958178 A | 7/2014 |

(Continued)

OTHER PUBLICATIONS

International Search Report for PCT/JP2016/086494 dated Mar. 7, 2017 [PCT/ISA/210].

(Continued)

*Primary Examiner* — Jacob T Minskey
*Assistant Examiner* — Matthew Hoover
(74) *Attorney, Agent, or Firm* — Sughrue Mion, PLLC

(57) ABSTRACT

A method for three-dimensionally forming a resin packaging member. The resin packaging member is heated to a temperature not higher than the Vicat softening temperature of the packaging member, and then compression shaping is conducted at a temperature not lower than room temperature and not higher than the Vicat softening temperature so as to form a three-dimensionally shaped portion with a large protrusion.

8 Claims, 6 Drawing Sheets

(51) Int. Cl.
*B29C 59/00* (2006.01)
*B31F 1/00* (2006.01)
*B32B 7/00* (2019.01)
*B32B 27/00* (2006.01)
*B65D 1/00* (2006.01)
*B65D 33/00* (2006.01)
*B65D 65/00* (2006.01)
*B31B 70/88* (2017.01)
*B31F 1/07* (2006.01)
*B65D 65/40* (2006.01)
*B31B 70/74* (2017.01)
*B29C 59/02* (2006.01)
*B29C 43/46* (2006.01)
*B29C 59/04* (2006.01)
*B29C 43/52* (2006.01)
*B32B 7/12* (2006.01)
*B32B 27/08* (2006.01)
*B32B 27/36* (2006.01)
*B65D 1/28* (2006.01)
*B65D 33/16* (2006.01)

(52) U.S. Cl.
CPC ............ *B29C 59/046* (2013.01); *B31B 70/74* (2017.08); *B31B 70/76* (2017.08); *B31F 1/07* (2013.01); *B32B 7/12* (2013.01); *B32B 27/08* (2013.01); *B32B 27/36* (2013.01); *B65D 1/28* (2013.01); *B65D 33/00* (2013.01); *B65D 33/1691* (2013.01); *B65D 65/40* (2013.01); *B29C 2043/463* (2013.01); *B32B 2323/10* (2013.01); *B32B 2439/46* (2013.01)

(58) Field of Classification Search
CPC ......... B29C 43/00; B29C 43/40; B29C 43/46; B29C 43/50; B29C 43/52; B29C 59/00; B29C 59/02; B29C 59/026; B29C 59/04; B29C 59/046; B31F 1/00; B31F 1/07; B32B 7/00; B32B 7/10; B32B 7/12; B32B 27/00; B32B 27/08; B32B 27/30; B32B 27/36; B65D 1/00; B65D 1/20; B65D 1/28; B65D 33/00; B65D 33/10; B65D 33/16; B65D 33/169; B65D 33/1691; B65D 65/00; B65D 65/40
See application file for complete search history.

(56) References Cited

FOREIGN PATENT DOCUMENTS

| | | | |
|---|---|---|---|
| EP | 0 547 664 A2 | | 6/1993 |
| JP | 60-255416 A | | 12/1985 |
| JP | 7-206011 A | | 8/1995 |
| JP | 2004-142132 A | | 5/2004 |
| JP | 2010-076132 A | | 4/2010 |
| JP | 2010-131857 A | | 6/2010 |
| JP | 2010131857 | * | 6/2010 |
| JP | 2014-046655 A | | 3/2014 |
| JP | 2014046655 | * | 3/2014 |
| JP | 2015-37953 A | | 2/2015 |
| JP | 2015037953 | * | 2/2015 |
| JP | 2015-212089 A | | 11/2015 |
| JP | 2016-037044 A | | 3/2016 |
| JP | 2016-083797 A | | 5/2016 |

OTHER PUBLICATIONS

Communication dated Mar. 13, 2019, from the State Intellectual Property Office of People's Republic of China in counterpart Application No. 201680078094.1.
Communication dated Aug. 12, 2019, from the European Patent Office in counterpart European Application No. 16883731.8.

* cited by examiner

FIG. 3A
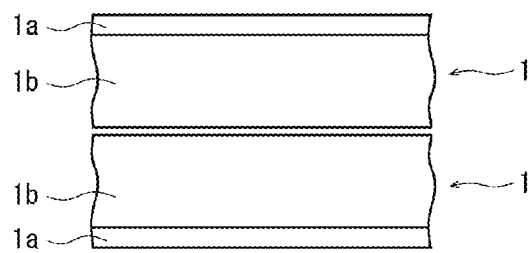
FIG. 3B
FIG. 3C
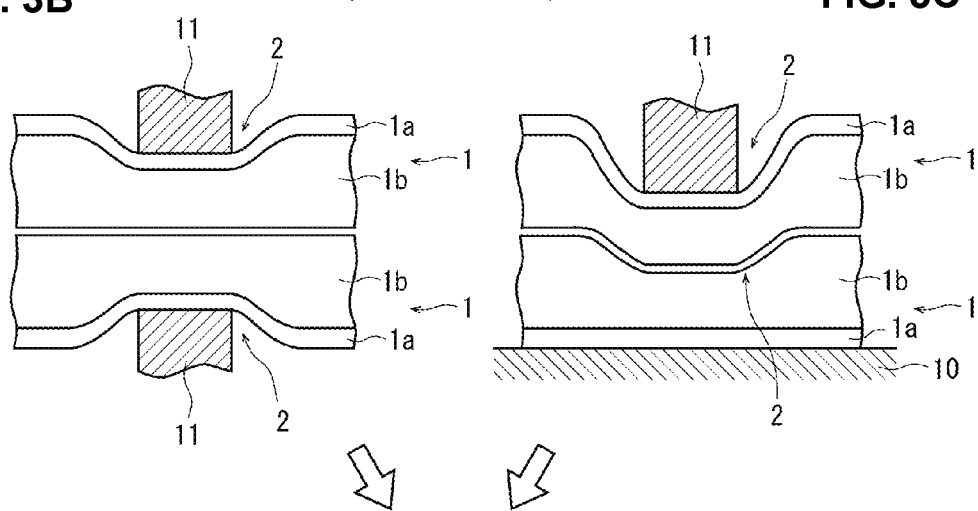
FIG. 3D
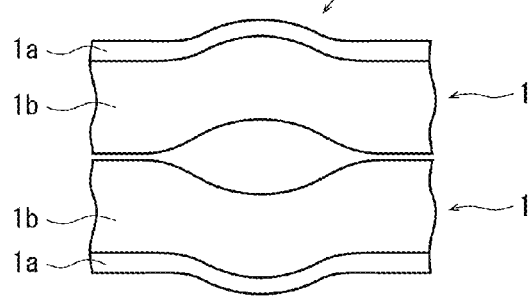

METHOD FOR THREE-DIMENSIONALLY SHAPING RESIN PACKAGING MEMBER, AND RESIN PACKAGING MEMBER

CROSS REFERENCE TO RELATED APPLICATIONS

This application is a National Stage of International Application No. PCT/JP2016/086494, filed on Dec. 8, 2016, which claims priority from Japanese Patent Application No. 2016-000660, filed on Jan. 5, 2016.

TECHNICAL FIELD

The present invention relates to a method for three-dimensionally shaping a resin packaging member. More specifically, the present invention relates to a method for three-dimensionally shaping a resin packaging member and a resin packaging member, where a decrease in the shaping height of a three-dimensionally shaped portion is prevented or controlled even in a case of hot filling with contents.

BACKGROUND ART

There has been a technique of three-dimensionally shaping a resin packaging member used for a flexible container such as a pouch. For instance, a pouch surface is embossed to have a character (here, this term may indicate also "letter" or "numeral"), a figure, a sign or the like, or decorated three-dimensionally to have a character, a mark or the like, thereby improving the design.

The following methods for embossing or shaping a three-dimensional decoration on a pouch have been proposed. Patent document 1 proposes a method for shaping a predetermined embossed pattern by heating and/or cooling a predetermined site of a bag-like container and by pressing with a pair of molds consisting of a male mold and a female mold. Patent document 2 proposes a processing method for shaping a protruded portion on a laminate film. According to Patent document 2, a mold for a character or a mark is heated and pressed onto a laminate film including a plurality of films different from each other in the thermal expansion coefficients, so that a part of the laminate film is heated to have a shape of the heated mold, and later, the heated mold is separated from the laminate film to stop the heating. In this manner, the shape of the heated mold may be transferred as a swelling to the film with a smaller thermal expansion coefficient and the laminate film may have a protruded portion.

However, according to the shaping method of Patent document 1, the temperature is raised to be substantially equivalent to or a little lower than the melting point of polyethylene arranged on the inner surface of the bag-like container, specifically to about 110° C. According to the processing method of Patent document 2, the temperature is raised to a range of about 100 to about 130° C. and the heating time is about 0.5 to about 5 seconds when the film with a large thermal expansion coefficient is made of a polyethylene-based resin, for instance. That is, in any case of Patent documents 1 and 2, the components are heated to a relatively high temperature approximate to the melting points of the films. This may cause some disadvantages. For instance, the resin flows during compression shaping, which inhibits reliable formation of a well-defined embossed pattern or a protruded portion. This may also cause excessive decrease in film thickness, cracks, and rupture at the periphery of the embossed pattern or the protruded portion. As a result, it may be difficult to obtain basic functions such as a gas barrier property, a vapor barrier property, a drop impact resistance, and a piercing resistance.

For solving these problems, the present inventors have proposed a three-dimensionally shaping method to compress-shape a laminated synthetic resin film in the thickness direction in a cold process, where the film comprises at least an innermost soft inner film and a high-strength outer film arranged outside (Patent document 3). In this method, there is no necessity of heating or cooling, and thus, energy required for processing can be reduced remarkably, and at the same time, the processing time can be shortened to enable a high-speed processing. In other words, the method is excellent also from the viewpoint of productivity.

PRIOR ART DOCUMENTS

Patent Documents

Patent Document 1: JP-A-2010-76132
Patent Document 2: JP-A-2004-142132
Patent Document 3: JP-A-2014-46655

SUMMARY OF THE INVENTION

Problems to be Solved by the Invention

However, the three-dimensionally shaping method of Patent document 3 has a problem. That is, shaping a three-dimensionally shaped portion with a large protrusion requires large shaping load, which may increase burden on the shaping equipment. Further, the three-dimensional shaping in a cold process without heating the film may increase the residual stress after the shaping, and thus, the shaping height of the three-dimensionally shaped portion may be decreased. This problem may occur, for instance, when shampoo or rinse that exhibits high viscosity at room temperature is heated for instance to 60° C. for decreasing the viscosity at filling and then used for filling, or when contents such as food like a thick sauce or a fruit juice drink are hot-filled at 80° C. for instance for sterilization.

Therefore, an object of the present invention is to provide a method for three-dimensionally shaping a resin packaging member. In the method, even in a case of forming a three-dimensionally shaped portion with a large protrusion, burdens imposed on shaping equipment may be decreased. Furthermore, the productivity is excellent, and the residual stress at the three-dimensionally shaped portion after the shaping is reduced. Even if the resin packaging member is employed for hot filling, a decrease in the shaping height of the three-dimensionally shaped portion may be prevented or controlled.

Another object of the present invention is to provide a resin packaging member that can be used for hot filling even if the resin packaging member has a large protrusion.

Means for Solving the Problems

The present invention provides a method for three-dimensionally shaping a resin packaging member. In the method, the resin packaging member is heated to a temperature not higher than the Vicat softening temperature of the packaging member, and then, compress-shaped at temperature not lower than room temperature and not higher than the Vicat softening temperature, thereby forming a compress-shaped portion protruding in a direction opposite to a compression direction.

It is preferable in the method for three-dimensionally shaping a resin packaging member of the present invention that:
1. the resin packaging member comprises an elastic sealant film and a less elastic outer film arranged outside, the Vicat softening temperature is the softening temperature of the sealant film, and the compression shaping is conducted from the outer film side;
2. the compression shaping is conducted by use of a male processing mold and an anvil; and
3. both the male processing mold and the anvil are formed as rotary rolls.

The present invention provides also a resin packaging member having a three-dimensionally shaped portion that protrudes outward, characterized in that the three-dimensionally shaped portion after hot filling has a shaping height of not less than 0.1 mm.

It is preferable in the resin packaging member of the present invention that:
1. the thickness of the thinnest part of a sealant film at the three-dimensionally shaped portion is 50 to 95% of the thickness of the sealant film before processing; and
2. the resin packaging member comprises at least an elastic sealant film and a less elastic outer film.

Further the present invention provides a pouch or a sealing member formed of the resin packaging member.

Effects of the Invention

In the method of the present invention for three-dimensionally shaping a resin packaging member, the resin packaging member to be used is heated to a temperature not higher than its Vicat softening temperature, and then, compression shaping is conducted at a temperature not lower than room temperature and not higher than the Vicat softening temperature. As a result, even in a case of forming a three-dimensionally shaped portion with a large protrusion, the shaping load can be decreased to reduce the burden on the shaping equipment, and at the same time, the productivity is improved remarkably. In addition to that, the residual stress at the three-dimensionally shaped portion after the shaping is decreased, and thus, even if the contents are heated for the filling, a decrease in the shaping height of the three-dimensionally shaped portion can be prevented or controlled.

According to the method for shaping the resin packaging member of the present invention, the resin flow may be prevented or controlled at the time of compression shaping. As a result, a well-defined three-dimensionally shaped portion can be formed reliably, and the thickness of the sealant film at the thinnest part of the three-dimensionally shaped portion can be kept within an appropriate range. Therefore, excellent three-dimensionally shaping property is ensured while preventing effectively an excessive decrease in the thickness of the film, cracks and ruptures at the three-dimensionally shaped portion, and as a result, basic functions such as a gas barrier property, a vapor barrier property, a drop impact resistance, and a piercing resistance can be obtained.

In the method for three-dimensionally shaping a resin packaging member of the present invention, the Vicat softening temperature is a temperature stipulated in JIS K 7206. The room temperature indicates the temperature range of 20° C.±15° C. stipulated in JIS Z 8703.

Further, in the resin packaging member of the present invention, the shaping height of the three-dimensionally shaped portion protruding outward after hot filling is set to 0.1 mm or more. The resin packaging member is provided with an embossed pattern of a character, a figure, a sign or the like, or three-dimensionally decorated with a character, a mark or the like to enhance the design, thereby providing a resin packaging member suitable even for use in a case of heating the contents for filling.

In the resin packaging member of the present invention, the thinnest part of the three-dimensionally shaped portion denotes the periphery of the three-dimensionally shaped portion formed by compression shaping or a thinnest part formed in the vicinity of the periphery of the three-dimensionally shaped portion.

Further in the resin packaging member of the present invention, a decrease in the shaping height of the three-dimensionally shaped portion is prevented or controlled even when the contents are heated for filling. As a result, the shaping height of not less than 0.1 mm is kept, and remarkable decorative effect may be maintained when the three-dimensionally shaped portion is formed as a pattern.

BRIEF DESCRIPTION OF THE DRAWINGS

FIG. 3 includes views for explaining a method for three-dimensionally shaping a resin packaging members of the present invention, where two sheets of the resin packaging members are lapped.

MODE FOR CARRYING OUT THE INVENTION (Three-Dimensional Shaping Method)

Figure 1A:
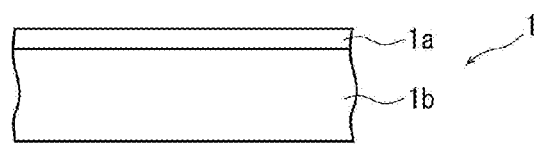
FIG. 1 includes views for explaining a method for three-dimensionally shaping a resin packaging member of the present invention.
Figure 1A:
Figure 1B:
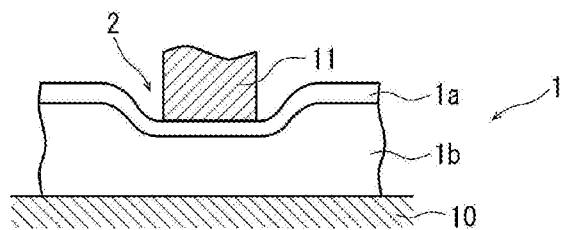
Figure 1B:
Figure 1C:
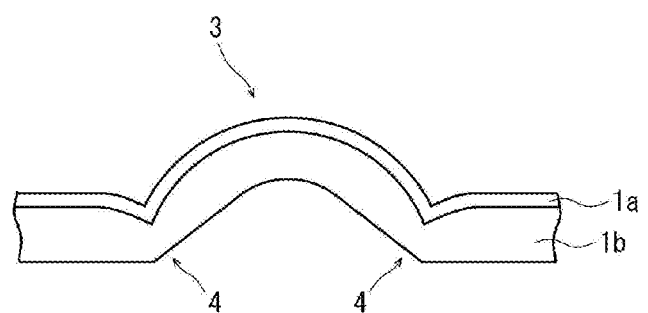

The method for three-dimensionally shaping a resin packaging member of the present invention will be described below with reference to FIGS. 1A to 1C. The resin packaging member illustrated in FIGS. 1A to 1C uses a laminate film 1 comprising a less elastic outer film 1a and an elastic sealant film 1b.

In the present invention, prior to a compress-shaping step, the laminate film 1 comprising the less elastic outer film 1a and the elastic sealant film 1b is heated to a temperature not higher than the Vicat softening temperature of the sealant film 1b.

Next, the laminate film 1 heated to a temperature not higher than the Vicat softening temperature is placed on an anvil 10 so that the sealant film to make the innermost face becomes the lower side. Then, the laminate film 1 is compress-shaped at a predetermined site in the thickness direction of the laminate film 1 by pressing from above with a processing mold 11 heated to a temperature not lower than room temperature and not higher than the Vicat temperature. When the processing mold 11 is detached, a compressed site 2 released from pressure protrudes toward the less elastic outer film 1a side. Due to this phenomenon, a three-dimensionally shaped portion 3 (this may be called also "protrusion") is formed.

The mechanism for formation of the protrusion is considered as follows. That is, when the laminate film 1 is compressed in the thickness direction, the innermost sealant film 1b is stretched greatly to be pushed out from the compressed plane, and the less elastic outer film 1a also is stretched in accordance with the stretch of the sealant film 1b. After the compression force is released, the less elastic outer film 1a that has experienced plastic deformation recovers only slightly, while the sealant film 1b recovers greatly, whereby the site 2 protrudes toward the outer film 1a side.

According to the present invention, it is possible to conduct the three-dimensional shaping not only on the aforementioned laminate film prepared by laminating resin films different from each other in the elasticity but on a single layer film composed of the sealant film.

(Resin Packaging Member)

A laminate film that is used in a conventional protrusion shaping comprises a less elastic outer film and an elastic inner film, and it can be used for the resin packaging member of the present invention, and in particular, a laminate film prepared by combining a sealant film as the elastic inner film can be used preferably.

For the sealant film, any conventional materials can be used without any particular limitation. Specific examples therefor include low-, medium- or high density polyethylene (PE), linear low density polyethylene (LLDPE), linear ultralow density polyethylene (LULDPE), isotactic polypropylene (PP), a propylene-ethylene copolymer, an ethylene-vinyl acetate copolymer, an ethylene-acrylic acid copolymer, an ethylene-methyl methacrylate copolymer, an ionically crosslinked olefin copolymer (ionomer), and a modified olefinic resin such as an olefin resin graft-modified with ethylenically unsaturated carboxylic acid or its anhydride. Preferably, it is a film containing at least a linear low density polyethylene, and preferably it contains also low density polyethylene, high density polyethylene, an ethylene-α olefin copolymer or the like together with the linear low density polyethylene.

Further it may contain additives such as a known anti-blocking agent.

For the less elastic film used in combination with the sealant film, a stretched film can be used preferably. Specifically, polyamide films such as a nylon film, and polyester films such as a polyethylene terephthalate (PET) film can be used preferably.

Comparison of the stretch of films can be made with reference to modulus of elasticity (Young's modulus), yield elongation, and the like.

Usually the sealant film of the laminate film has a thickness in a range of about 60 to about 200 μm, the outer film has a thickness in a range of about 10 to about 20 μm, and the thickness of the sealant film is about 3 to about 20 times the thickness of the outer film, though the ranges are not limited to these examples. The total thickness of the laminate film may vary depending on the use and cannot be determined unconditionally, but preferably it is in a range of about 70 to about 300 μm usually when the laminate film includes any additional layer(s).

The laminate film may further include another synthetic resin film laminated between the innermost sealant film and the outer film, or outside the outer film.

Alternatively, depending on the surface condition of the processing mold and the anvil in use, a single layer film of the aforementioned sealant film can be used for the resin packaging member as mentioned above. When the sealant film is used as a single layer, the thickness of the sealant film desirably is in the range of 50 to 500 μm although the thickness varies depending on the use and cannot be determined unconditionally.

(Heating Method)

In the three-dimensionally shaping method of the present invention, the resin packaging member is heated to a temperature not higher than the Vicat softening temperature of the resin packaging member before compression shaping, for instance, it is heated to a temperature higher than room temperature, more specifically, a temperature higher than 35° C. and lower by 20° C. than the Vicat softening temperature. If the resin packaging member is heated to a temperature higher than the Vicat softening temperature, the resin may flow during the compression shaping, and thus, it may be impossible to reliably form the three-dimensionally shaped portion. Further, the periphery of the three-dimensionally shaped portion or the vicinity of the periphery at the three-dimensionally shaped portion may be excessively thin due to the compression shaping. On the other hand, the temperature lower than the range, i.e., lower than 35° C. indicates that the heating, is insufficient. In this case, great loading may be required for the compression shaping, and it may increase burden on the shaping equipment. Further, residual stress after shaping the film may be increased. As a result, when the contents are heated for filling, the shaping height of the three-dimensionally shaped portion may be lower than 0.1 mm.

In the present invention, the resin packaging member is heated so that the surface temperature of the resin packaging member reaches the desired temperature. Since a typical resin packaging member is relatively thin, even the interior thereof can be heated easily and homogeneously by the heating. The entire resin packaging member may be heated or the region to be heated may be limited to the compress-shaped portion and its vicinity.

The method for heating the resin packaging member is not limited particularly as long as the resin packaging member can be heated homogeneously, and any conventionally known methods can be employed. The methods include heating by heat conduction using a hot plate, a heating roll, a heating bar or the like, high frequency induction heating, infrared heating, and hot air heating.

(Compression Shaping Method)

In the method for three-dimensionally shaping the resin packaging member of the present invention, the resin packaging member heated to a temperature not higher than the Vicat softening temperature is compress-shaped at a temperature not lower than the room temperature and not higher than the Vicat softening temperature, whereby the compression-shaped part protrudes in a direction opposite to the compression direction so as to form the three-dimensionally shaped portion.

The compression shaping can be conducted similarly to a conventional protrusion shaping. It can be conducted using a conventionally known compression shaping apparatus, and examples thereof include a planar pressing apparatus to conduct planar compression or a rotary processing apparatus to conduct compression utilizing rotation of a pair of shaping rolls. It is particularly preferable that the processing unit consists of a processing mold (punch) and an anvil (cradle). It is preferable in the present invention that both the processing mold and the anvil are set at a temperature not lower than room temperature and not higher than the Vicat softening temperature, in particular, not lower than room temperature and lower by 20° C. than the Vicat softening temperature. It is also preferable to adjust the temperature to prevent or control temperature change in the processing mold and the anvil from the viewpoint of preventing fluctuation in the shaping height of the three-dimensionally shaped portion.

Figure 2:
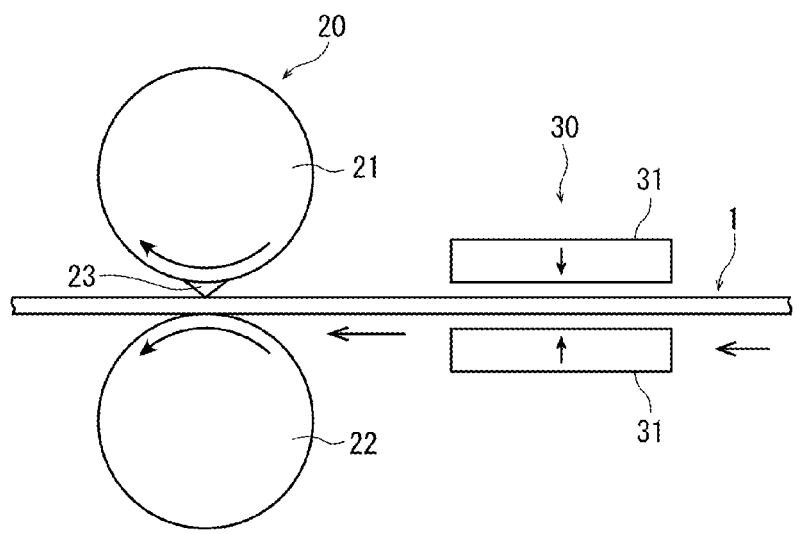
FIG. 2 is a view for explaining a method for three-dimensionally shaping, by use of rotary rolls, a resin packaging member of the present invention.

FIG. 2 is a schematic view for explaining a processing unit of a compression shaping apparatus to be used in the three-dimensionally shaping method of the present invention, and it shows an example of preferred embodiments. In FIG. 2, a compression shaping machine 20 allows a pair of rotary rolls 21, 22 to roll for compression shaping. The rotary roll (shaping mold) 21 is fitted with a male processing mold (punch) 23, and the rotary roll 22 is constituted as an anvil roll. The tip end of the male processing mold 23 is substantially flat relative to the longitudinal direction of the rotary roll 21, and it forms a circular arc whose radius is equal to the distance from the rotation center to the tip end relative to the circumferential direction of the rotary roll 21. More specifically, in a case where the shaping height varies depending on the sites due to warping of the rotary rolls 21, 22 or a clearance between these rolls, the shaping heights at the respective portions can be adjusted by finely adjusting the height at the tip end of the male processing mold 23.

Further, as evidently shown in FIG. 2, an elongated resin packaging member 1 being introduced into the compression shaping machine 20 is heated to a desired temperature not higher than the Vicat softening temperature by use of the heating unit 30 provided upstream in the compression shaping machine 20. The heating unit 30 in FIG. 2 is composed of hot plates 31, 31 to intermittently drive the resin packaging member 1 vertically to heat the resin packaging member 1 from the both surfaces, a thermocouple (not shown) to regulate the temperature of the hot plates 31, 31, and an infrared radiation thermometer (not shown) to measure the surface temperature of the resin packaging member.

As shown in FIG. 2, since both the shaping mold and the anvil are constituted as rotary rolls, the compression shaping at the processing unit is performed through a point contact or a line contact. This means that the contact area is extremely small in comparison with the planar pressing apparatus, and thus, power required for the shaping can be applied effectively to reduce the burden imposed on the shaping apparatus and to save energy.

In the method for three-dimensionally shaping the resin packaging member of the present invention, it is possible to use a resin packaging member of a laminate film comprising a less elastic outer film and a sealant film. In that case, a pair of laminate films are lapped so that the sealant films will face each other, or the laminate films are processed to form a pouch before compress-shaping. FIGS. 3B and 3C show the respective embodiments. FIG. 3B shows a case where the laminate films of FIG. 3A are compress-shaped from both surfaces in the thickness direction, and FIG. 3C shows a case where the laminate films of FIG. 3A are compressed from one of the surfaces in the thickness direction. In any of these cases, in the respective resin packaging members, each laminate film comprising a less elastic outer film 1a and a sealant film 1b protrudes toward the less elastic outer film. As a result, the respective resin packaging members may protrude outward for three-dimensional shaping as shown in FIG. 3D.

It is difficult to determine unconditionally the compression shaping load in the method for three-dimensionally shaping the resin packaging member of the present invention, since the load may vary depending on the shaping height, width and length of the three-dimensionally shaped portion to be formed and the temperature to heat the resin packaging member. When the resin packaging member is compress-shaped in the thickness direction so that the thickness is decreased to a range of about 30 to about 70% of the total thickness, the three-dimensionally shaped portion can protrude in a direction opposite to the compression direction (i.e., outward). When the total thickness of the resin packaging member at the time of compression shaping is decreased to less than 30%, problems such as excessive decrease in thickness of the film, cracks or rupture may occur in the film at the three-dimensionally shaped portion. When the total thickness after being decreased is more than 70%, the shaping height of the three-dimensionally shaped portion may be insufficient after the compression shaping, so that the three-dimensionally shaped portion 3 may have inferior definition and inferior decorative effect, and the design may deteriorate.

In the present invention, the resin packaging member to be subjected to compression shaping is heated in advance to a temperature not higher than the Vicat softening temperature. This enables compression shaping at smaller load when compared to compression shaping in a conventional cold process that uses a similar resin packaging member.

(Three-Dimensionally Shaped Portion)

Though the shape of the three-dimensionally shaped portion formed by the aforementioned method is not limited in particular in the present invention, it protrudes in a direction opposite to the compression direction. The shaping height is not less than 0.1 mm, preferably in a range of 0.15 to 0.5 mm, the width is in a range of 1 to 3 mm, and the length is not more than 100 mm.

As described above, when the resin packaging member is compressed in the thickness direction, the region surrounding the compressed site may protrude in a direction opposite to the compression direction. Therefore, as shown in FIG. 1C, after the compression force is released, the thickness at the periphery 4 of the three-dimensionally shaped portion 3 or the region in the vicinity of the periphery 4 of the three-dimensionally shaped portion 3 may be decreased most. This thinnest periphery (thinnest part) 4 is inevitably formed and it may be effective in defining the contour of the three-dimensionally shaped portion 3. However, when it is excessively thin, the resin packaging member may be ruptured.

Figure 4:
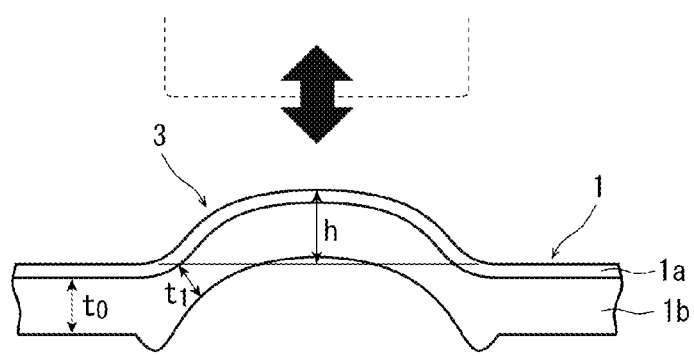
FIG. 4 is a view showing a thickness of a thinnest part of a sealant film at the three-dimensionally shaped portion and a thickness of the sealant film before compress shaping.

In contrast, in the present invention, a resin packaging member heated to a temperature not higher than the Vicat softening temperature is used and compression shaping is conducted at a temperature not lower than room temperature and not higher than the Vicat softening temperature. As a result, as shown in FIG. 4, the thinnest part thickness t1 of the sealant film 1b at the three-dimensionally shaped portion 3 has a thickness of 50 to 95%, preferably 60 to 90% of the thickness of the sealant film 1b before the compression shaping. In other words, a sufficient film thickness is maintained.

When the thickness at the thinnest part 4 of the sealant film 1b at the three-dimensionally shaped portion 3 is less than 50% of the thickness of the sealant film 1b before compression shaping, the contour or the surface condition of the three-dimensionally shaped portion 3 may be poorly defined and the design may deteriorate. Further, rupture or delamination may occur at the three-dimensionally shaped portion 3. When the thickness is more than 95%, the shaping height of the three-dimensionally shaped portion 3 may be insufficient, causing inferior definition and inferior decorative effect of the three-dimensionally shaped portion 3 and also degradation in design.

Figure 5:
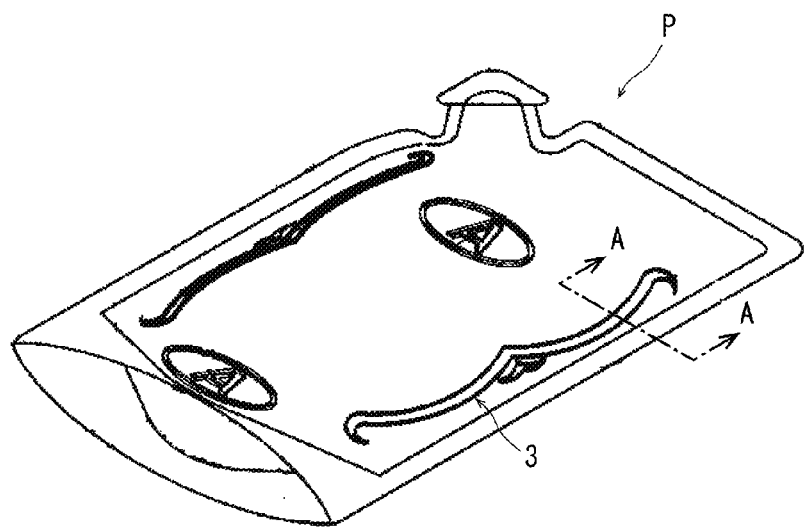
FIG. 5 is a view showing a three-dimensionally shaped portion of a pouch.

In FIG. 4, t1 indicates a thinnest part thickness of the sealant film 1b at the three-dimensionally shaped portion 3, and t0 indicates thickness of the sealant film 1b before the compression shaping. These thicknesses correspond to the thicknesses on the A-A cross section of the three-dimensionally shaped portion 3 of a pouch P shown in FIG. 5, for instance.

(Pouch)

The pouch formed of the resin packaging member of the present invention can be prepared in the following manner after three-dimensionally shaping the resin packaging member. That is, a plurality of resin packaging members, at least one of which has been processed to have a three-dimensionally shaped portion, are lapped so that the sealant films are located inside, and the members are sealed at their rims to form a pouch. Alternatively, a plurality of resin packaging members are lapped so that their sealant films are located inside, sealed at their rims to form a pouch, and then, the three-dimensionally shaped.

The three-dimensionally shaped portion can be formed as a pattern to improve the design or a passage to communicate with a spout.

The pouch can be formed as any conventionally known pouch such as a standing pouch, a three-side sealed pouch and a four-side sealed pouch. The standing pouch can be formed by lapping resin packaging members so that the respective sealant films will be located inside, the side rims of the resin packaging members are sealed to form side-sealed parts and then sandwiching and sealing a bi-folded bottom film on the bottom to form a bottom sealing part.

(Sealing Member)

Since the resin packaging member of the present invention has a sealant film, it can be cut directly into a desired size to be used preferably as a sealing member. The sealing member can be used preferably as a lid for a cup-like or tray-like container for instance and a label for a pouch or a container, though these examples are not limitative.

EXAMPLES

<Laminate Film>
Sealant film: linear low density polyethylene film (120 μm)
  Vicat softening temperature: 98° C.
Intermediate film: aluminum vapor deposition PET film (12 μm)
Outer film: nylon film (15 μm)
Adhesive layer: polyurethane-based adhesive (4 μm×two layers)

Experimental Example 1

<Shaping Load During Compression Shaping>

The laminate films were heated (to any of film temperatures) and introduced into the space between a rotary roll fitted with a processing mold and a lower rotary roll (anvil) so as to be compress-shaped at room temperature. Here, the processing mold on the rotary roll was pressed onto the laminate film by use of an air cylinder, and the cylinder load of the air cylinder during the compression shaping was measured.

Established clearance: 0.03 mm;
Shaping width for compression shaping: 50 mm (shaping width is the width in the direction identical to the width of the laminate film, and the central part);
Shaping length: 3 mm; and
Film temperature: room temperature (25° C.), 40° C., 60° C.

The lower limit of the shaping height of the three-dimensionally shaped portion is determined to be 0.15 mm in order to keep a shaping height of not less than 0.1 mm to obtain a stereoscopic effect of the three-dimensionally shaped portion after warming in hot water, based on the relationship between the condition for heating the laminate film, the temperature for warming in hot water, and the shaping height of the three-dimensionally shaped portion, as mentioned below.

Figure 6:
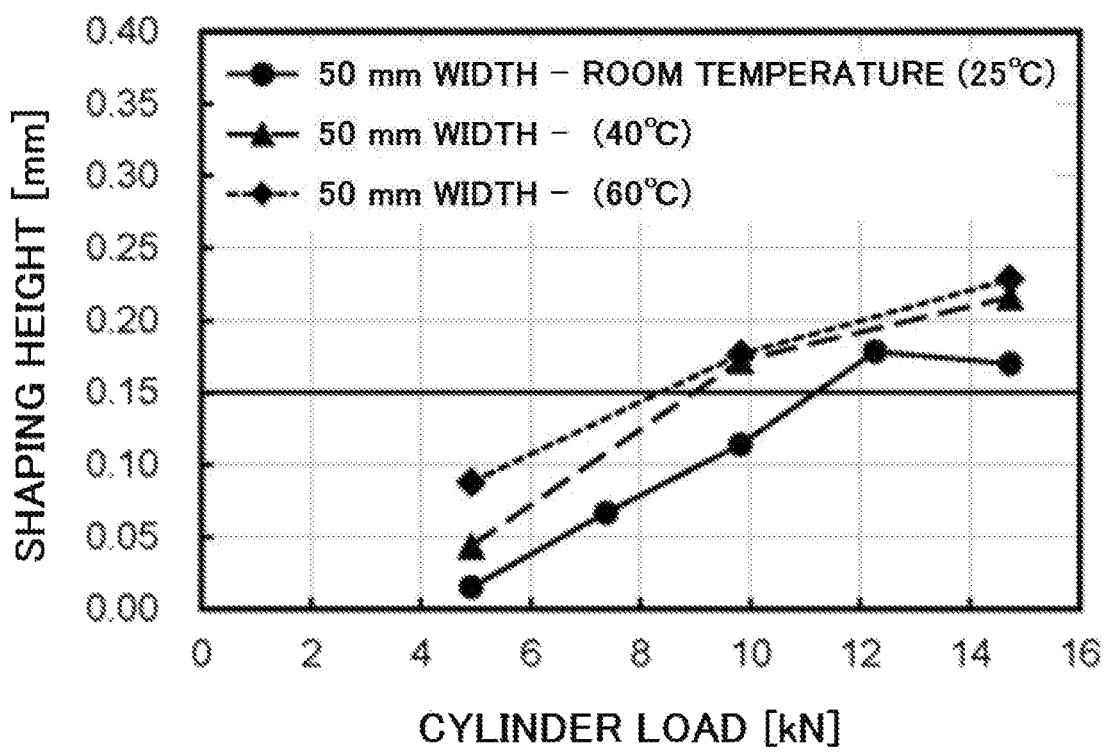
FIG. 6 is a graph showing the relationship between shaping height and cylinder load.

The results of the measurement are shown in FIG. 6.

As shown in FIG. 6, the cylinder load was 12 kN (6 kN for each surface) when the shaping height on the laminate film was more than 0.15 mm at room temperature. By heating the laminate film to 40° C. or 60° C., the shaping load was reduced to 10 kN (5 kN for each surface).

Experimental Example 2

<Shaping Height of Three-Dimensionally Shaped Portion Depending on Shaping Temperature (Film Temperature)>
1. Heating of Laminate Film Laminate films were heated to room, temperature (25° C.) or to 40° C., 50° C. and 60° C. (film temperature) and introduced into a shaping machine.

The laminate films were heated with an infrared heater from above and below. The temperature of the laminate film was measured with an infrared radiation thermometer.
2. Compression Shaping of Laminate Film
<Condition for Compression Shaping>
  Web width of laminate film: 250 mm
  Shaping rate: 120 rpm (0.8 m/s)
  Roll diameter: Φ130
  Established clearance between processing mold on shaping roll and anvil mold: 0.03 mm, 0.05 mm
  Shaping load: 12 kN or less
  Shaping width (roll longitudinal direction): 50 mm
  Shaping length (roll rotation direction): 3 mm
  Shaping temperature (temperature of the processing mold and the anvil): room temperature (25° C.)
3. Measurement of Shaping Height of Three-Dimensionally Shaped Portion The laminate films were compress-shaped under the conditions 1. and 2., and the shaping heights of three-dimensionally shaped portions formed on the respective laminate films were measured with a surface shape measuring instrument.

Figure 7:
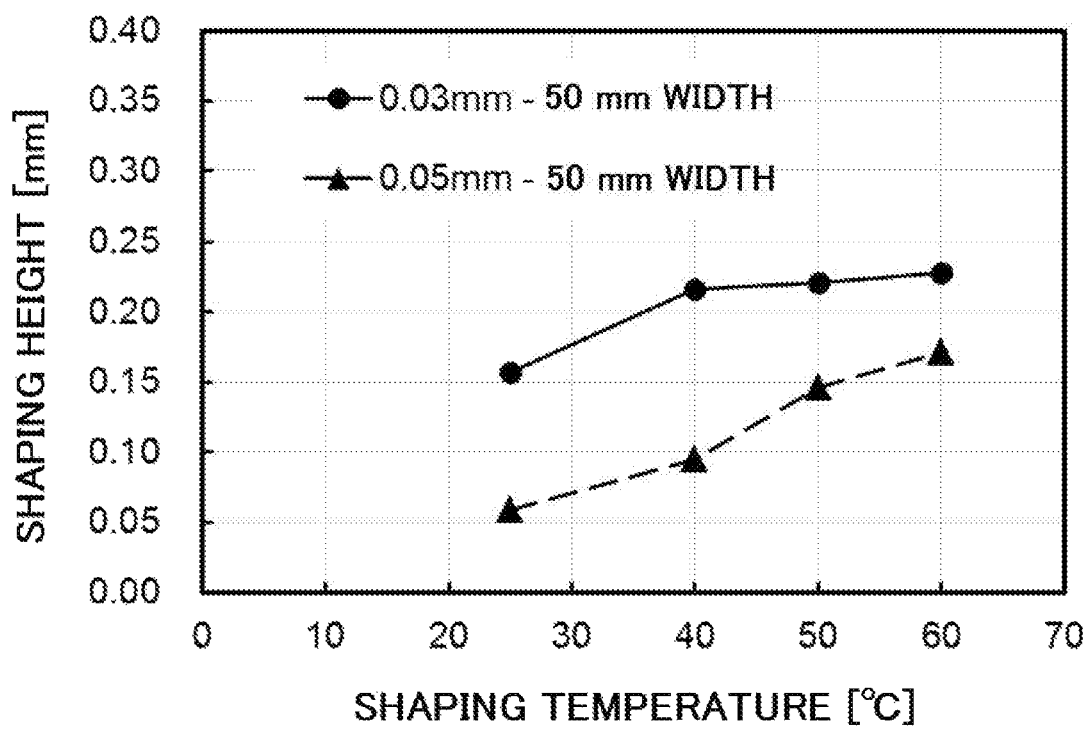
FIG. 7 is a graph showing the relationship between shaping height and a shaping temperature.

The measurement results are shown in FIG. 7.

As shown in FIG. 7, the shaping height of the three-dimensionally shaped portion was increased with the increase in the shaping temperature of the laminate film (film temperature).
4. Experiment by Warming in Hot Water The three-dimensionally shaped portions were formed on the respective laminate films by compression shaping under the shaping conditions 1. 2., and the laminate films were warmed in hot water, followed by measurement of the shaping heights of the three-dimensionally shaped portion at each temperature in the warming, and the shaping height of the three-dimensionally shaped portion before and after the warming.

Figure 8:
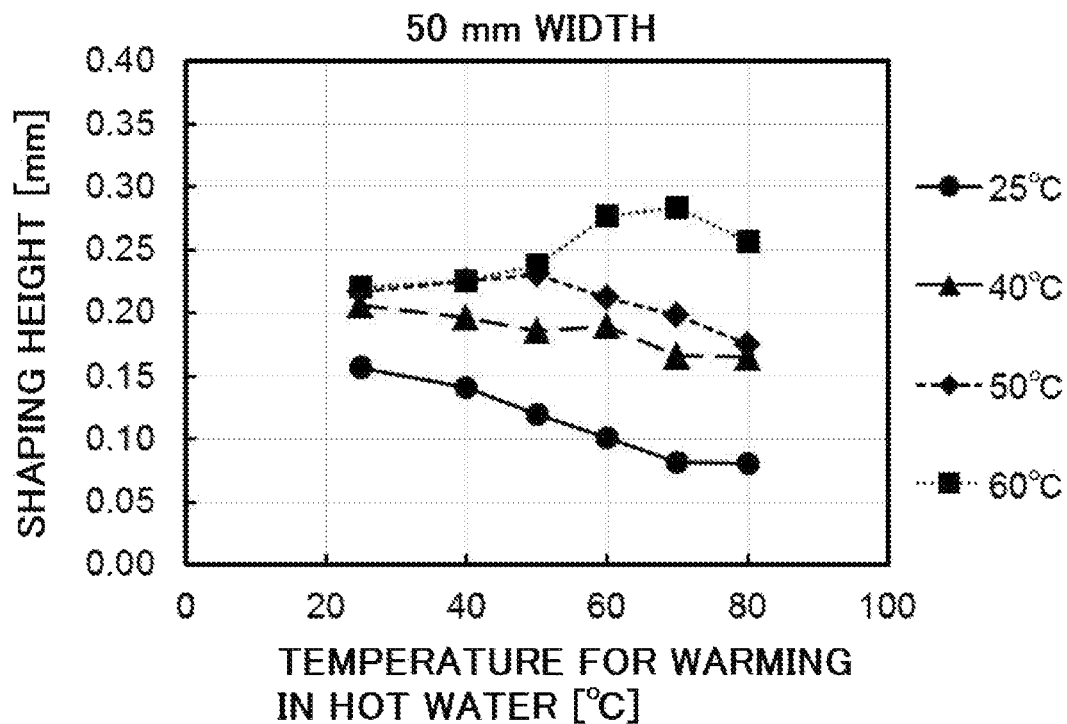
FIG. 8 is a graph showing the relationship between shaping height and temperature for warming in hot water.
Figure 9:
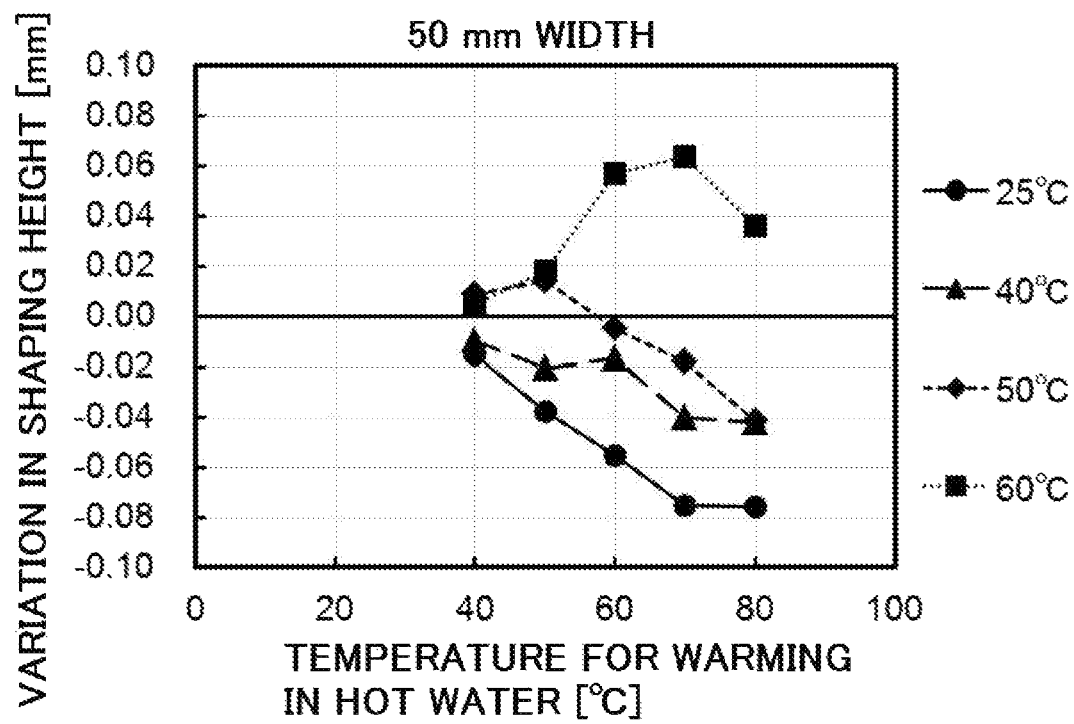
FIG. 9 is a graph showing the relationship between a variation in the shaping height before and after warming in hot water, and temperature for the warming.

FIGS. 8 and 9 show the shaping height before and after warming and the variation respectively.

As shown in FIGS. 8 and 9, when the temperature to heat the aforementioned laminate films is lower, the shaping height of the three-dimensionally shaped portion is decreased with the rise in the temperature during the warming in hot water (see FIG. 7). In the meantime, when the temperature to heat the laminate film was 60° C., the shaping height after warming in hot water was higher than the shaping height before the warming, though the reason has not been clarified.

In the aforementioned Experimental Examples 1 and 2, the resin packaging members (laminate films) are heated to a temperature not higher than the Vicat softening temperature of the packaging member and then compress-shaped at room temperature. In such a case, even when a three-dimensionally shaped portion with a large protrusion is formed, the shaping load is reduced to decrease the burden on the shaping equipment, resulting in excellent productivity. Furthermore, the residual stress at the three-dimensionally shaped portion after the process is relieved. In the thus obtained resin packaging member, a decrease in the shaping height of the three-dimensionally shaped portion can be prevented or controlled even after hot filling with contents.

EXPLANATIONS OF LETTERS OR NUMERALS

1: resin packaging member (laminate film); 2: compressed site; 3: three-dimensionally shaped portion; 4: thinnest part; 10: anvil; 11: processing mold; 20: compression shaping machine; 21,22: rotary rolls; 23: processing mold; 30: heating unit; 31: hot plate

The invention claimed is:

1. A resin packaging member having a three-dimensionally shaped portion that protrudes outward, the three-dimensionally shaped portion after hot filling has a shaping height of not less than 0.1 mm, and having a sealant film that has, at the thinnest part of the three-dimensionally shaped portion, a thickness of 50 to 95% of a thickness of the sealant film before processing.

2. The resin packaging member according to claim 1, wherein the resin packaging member comprises at least an elastic sealant film and a less elastic outer film.

3. A method for three-dimensionally shaping the resin packaging member according to claim 1, comprising heating the resin packaging member to a temperature not higher than a Vicat softening temperature of the packaging member and conducting a compress-shaping at a temperature not lower than room temperature and not higher than the Vicat softening temperature so as to form a compress-shaped portion protruding in a direction opposite to a compression direction.

4. The method for three-dimensionally shaping according to claim 3, wherein the resin packaging member comprises an elastic sealant film and a less elastic outer film arranged outside, the Vicat softening temperature is a softening temperature of the sealant film, and the compression shaping is conducted from the outer film side.

5. The method for three-dimensionally shaping according to claim 3, wherein the compression shaping is conducted by use of a male processing mold and an anvil.

6. The method for three-dimensionally shaping according to claim 5, wherein both the male processing mold and the anvil are formed as rotary rolls.

7. A pouch formed of the resin packaging member according to claim 1.

8. A sealing member formed of the resin packaging member according to claim 1.

* * * * *